US010885009B1

(12) United States Patent
Anghel

(10) Patent No.: US 10,885,009 B1
(45) Date of Patent: Jan. 5, 2021

(54) GENERATING AGGREGATE VIEWS FOR DATA INDICES

(71) Applicant: Amazon Technologies, Inc., Reno, NV (US)

(72) Inventor: Joshua Joseph Anghel, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 940 days.

(21) Appl. No.: 15/182,199

(22) Filed: Jun. 14, 2016

(51) Int. Cl.
G06F 16/22 (2019.01)
G06F 16/93 (2019.01)
G06F 16/23 (2019.01)

(52) U.S. Cl.
CPC ...... G06F 16/2272 (2019.01); G06F 16/2315 (2019.01); G06F 16/2343 (2019.01); G06F 16/93 (2019.01)

(58) Field of Classification Search
CPC ............... G06F 16/219; G06F 16/2272
See application file for complete search history.

(56) References Cited

U.S. PATENT DOCUMENTS 8,433,687 B1* 4/2013 Pydi .................. G06F 8/71
707/610
8,880,499 B1* 11/2014 Wu .................... H04L 67/32
707/710
9,047,334 B1* 6/2015 Cheriton ............. G06F 16/2308
9,223,897 B1* 12/2015 Gross .................. G06F 16/838
2005/0154719 A1* 7/2005 Choudhary ............ G06F 16/31
2006/0059173 A1* 3/2006 Hirsch ................ G06F 11/1453
2006/0106792 A1* 5/2006 Patterson ................ G06F 16/93
2009/0228528 A1* 9/2009 Ercegovac ............. G06F 16/319
2011/0162009 A1* 6/2011 Adimatyam ........... H04N 5/775
725/40
2014/0052726 A1* 2/2014 Amberg ................ G06F 16/244
707/737
2014/0258217 A1* 9/2014 Kemmler ................ G06F 16/21
707/609

(Continued)

Primary Examiner — Mohammad S Rostami
(74) Attorney, Agent, or Firm — Hogan Lovells US LLP

(57) ABSTRACT

Approaches provide for management of resources such as data storage devices. For example, such approaches include providing an indexing service to reliably index data that may be accessed and used over one or more networks by any of various users, applications, processes, and/or services. As one example, data storage devices that store data may in some embodiments be co-located at a geographical location, such as in each of one or more geographically distributed data centers, and the application(s) that use a volume stored on a data storage device may execute on one or more other physical computing devices. An indexing service can operate on more or more of the data storage devices or portions of the data storage devices such as a directory, to manage and index data. The indexing service can monitor activity on a data storage device and any additions, deletions and/or modifications to data (e.g., documents, files, etc.) in a particular data storage device cause the indexing service to update its index while concurrently updating any aggregated documents associated with the data. The index can then be accessed by any of a number of applications in the same manner as conventional indexes.

17 Claims, 5 Drawing Sheets

(56) References Cited

U.S. PATENT DOCUMENTS

| | | | |
|---|---|---|---|
| 2014/0344453 A1* | 11/2014 | Varney | H04L 41/0803 709/224 |
| 2015/0134707 A1* | 5/2015 | Doherty | G06F 3/048 707/806 |
| 2015/0213134 A1* | 7/2015 | Nie | H04L 67/2895 707/770 |
| 2016/0055143 A1* | 2/2016 | Goel | G06F 17/277 715/229 |
| 2016/0179938 A1* | 6/2016 | Ghafourifar | G06F 21/6227 707/609 |
| 2016/0179981 A1* | 6/2016 | Enoki | G06F 16/319 707/800 |
| 2017/0011073 A1* | 1/2017 | Deshpande | G06F 16/215 |

* cited by examiner

GENERATING AGGREGATE VIEWS FOR DATA INDICES

BACKGROUND

As an increasing number of applications and services are being made available over networks such as the Internet, an increasing number of content, application, and/or service providers are turning to technologies such as remote resource sharing cloud computing. Cloud computing, in general, is an approach to providing access to electronic resources through services, such as Web services, where the hardware and/or software used to support those services is dynamically scalable to meet the needs of the services at any given time. However, the increased access to resources has led to more information being available, which can be more resource intensive to manage. Conventional approaches implement various indexing approaches to optimize data retrieval and other data management functions. However, in a cloud computing environment, such indexing becomes more complex due to the amount of data as well the data being distributed across the cloud computing environment.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to data management. In particular, various embodiments enable management of resources such as data storage devices. For example, in at least some embodiments, these approaches include providing an indexing service to reliably index data that may be accessed and used over one or more networks by any of various users, applications, processes, and/or services. As one example, data storage devices that store data may in some embodiments be co-located at a geographical location, such as in each of one or more geographically distributed data centers, and the application(s) that use a volume stored on a data storage device may execute on one or more other physical computing devices. An indexing service can operate on one or more of the data storage devices or portions of the data storage devices such as a directory, to manage and index data. The indexing service can monitor activity on a data storage device and any additions, deletions and/or modifications to data (e.g., documents, files, etc.) in a particular data storage device cause the indexing service to update its index while concurrently updating any aggregated documents associated with the data. The index can then be accessed by any of a number of applications in the same manner as conventional indexes. Various other functions and advantages are described and suggested below as may be provided in accordance with the various embodiments.

Figure 1:
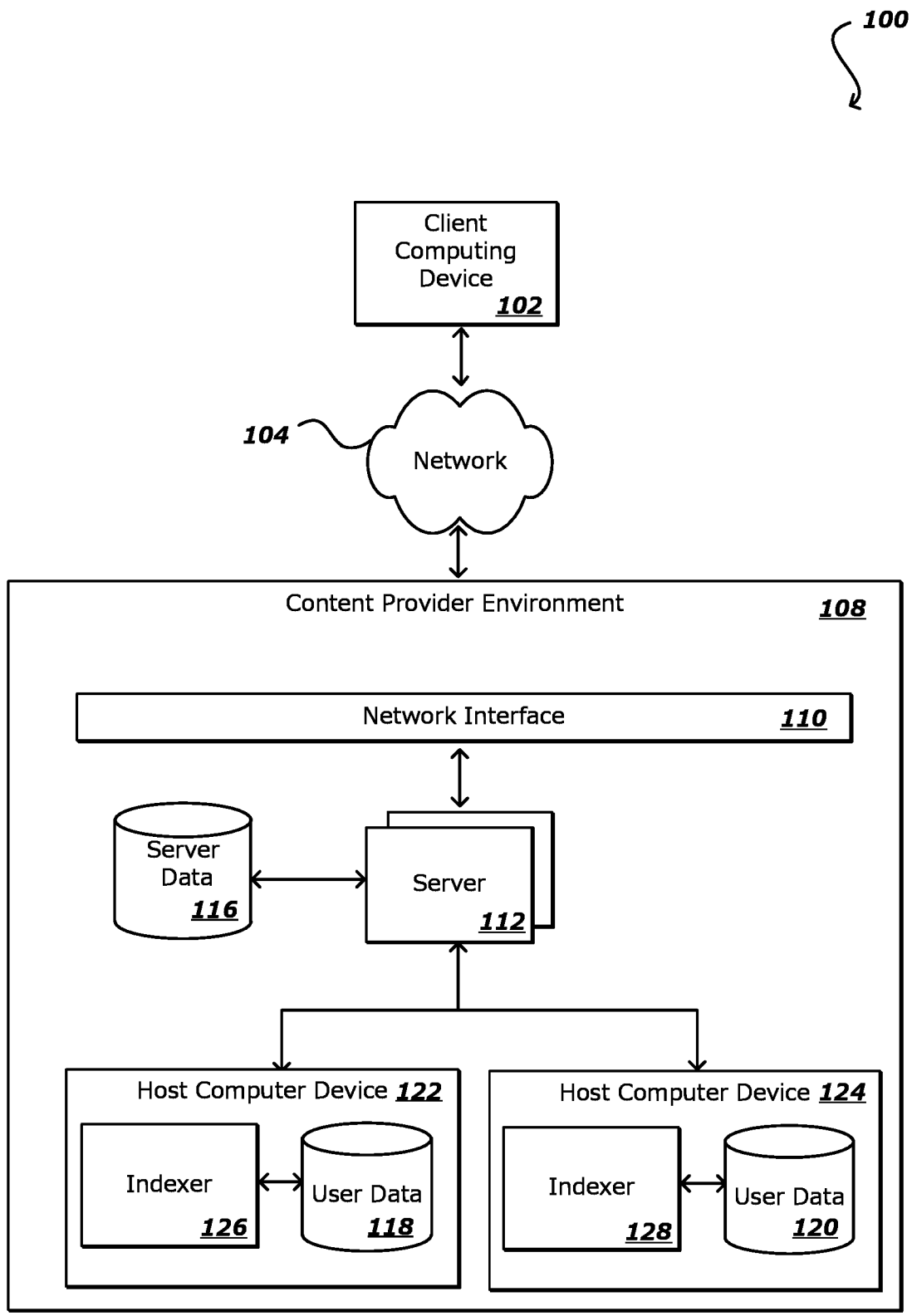
FIG. 1 illustrates an environment in which various embodiments can be implemented.

FIG. 1 illustrates an example environment 100 that can be used to implement aspects in accordance with various embodiments. In FIG. 1, a client computing device 102 can submit a query for content across at least one network 104 to be received by a content provider environment 108, such as an electronic marketplace, where the content can include items that can be consumed through the content provider environment. The query can include information such as customer behavior information such as application or service usage; user responsiveness to advertisements such as clickthrough rate; social media information; service and/or displayed advertisements; and/or any other information. In various embodiments, the information can be stored at the content provider environment. As will be described further herein, the query can cause data store entries to be updated, and the updated entries can be detected by an indexing service that is configured to manage the data. Although a portable computing device (e.g., an electronic book reader, smart phone, or table computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., watches, glasses, etc.) and portable players, among others.

In this example, a query received to the content provider environment 108 can be received by an interface layer 110 of the environment. As known for network environments, the interface layer can include components such as interfaces (e.g., APIs), load balancers, request and/or data routers, and the like. The network interface layer can include any appropriate components known or used to receive requests from across a network, such as may include one or more application programming interfaces (APIs) or other such interfaces for receiving such requests. The interface layer 110 might be owned and operated by a content provider of the content provider environment, or leveraged by the content provider as part of a shared resource or "cloud" offering. Example APIs include a search API that allows for searching content provided by the content provider environment, an index API that allows for updating and deleting entries managed by an indexing service, among other such APIs. The interface layer 110 can receive and analyze the query from the client computing device 102, and can cause at least a portion of the information in the request to be directed to an appropriate system or service, such as a server 112 (e.g., a Web server or application server), among other such options. It should be noted that although a user is described as accessing content and services provided by the content provider, in various embodiments, the interface layer 110 can receive and analyze requests from applications, customers, and other entities. The requests by such entities can, for example and as will be described further herein, be to perform operations against an index.

At least one server 112 might be used to generate and send the content to the client computing device. To obtain the content, the servers or other components of the environment might access one or more data stores, such as user data stores 118 and 120 that contain information about the various users, and one or more server content data stores 116 storing content able to be served to those users. The information about the various users can include, for example, purchase history; customer behavior such as application or service usage; user responsiveness to advertisements such as click-through rate; social media information; service and/or displayed advertisements; and/or any other information that can be used to indicate user preference to a type of advertisement and/or recommended content.

The user data stores 118 and 120 can be associated with host computing device 122 and 124 respectively. Although two host computing devices are shown, it should be understood that such an environment can include multiple host computing devices as part as a distributed computing environment, each interconnected. It should be further noted that embodiments described herein are not limited to any particular configuration of host computing devices, networks, storage, or other computing devices. In accordance with an embodiment, host computing devices 118 and 120 can host a virtual machine instance that can be used to run software, such as software to manage a data store, perform indexing and searching operations, information retrieval capability, as well as other tasks and functions. An indexer 126 and 128 running on a respective host computing device (122, 124) can be associated with a particular storage location, such as a data store, or directory of a data store to maintain an index of data for those locations. In accordance with various embodiments, an indexer may reside on a host computing device for indexing local storage attached to that host computing device, may reside on shared data stores, may reside on a host computing device and index data stored on shared storage to which the host computing device is connected, among other such configurations. In certain embodiments, there may different indexers for different storage locations. In a distributed environment, multiple indexers can be used to balance the search load and provide scalability.

The additional information (e.g., user behavior information) can be stored to a table in an appropriate data store and can be used for reporting or statistical analysis with other data, enabling various types of reporting and analysis to be performed across various types of data. However, as described, increased access to resources has led to an increased amount of information being available electronically. With the increased information, it is difficult to quickly access information and perform analysis of the information. For example, in conventional systems where data is stored at a granular level, queries for such data can require additional time and resources. For example, the more granular the data, the larger the table size required to organize the data, and the larger the table size, the more expensive (e.g., time and energy) it is to search and/or index the granular data. In the situation where granular data is not needed for at least some search purposes, the granular data can be summarized to generate a summary of the data (also referred to as aggregated data, summary documents, summary data, aggregated documents).

In accordance with various embodiments, aggregated data can represent a persistent view of data that is at a higher level than the base data. As would be apparent to those skilled in the art, aggregations can be run against granular data to generate aggregated data. In one such example, aggregations can include the process of grouping and compressing result rows on the identical values of one column, while at the same time applying "summary" (aggregation) functions on other columns. For example, the result set on a taxonomy term can be grouped so that all rows sharing the same value of the taxonomy column are represented as single rows, with aggregation functions are applied to the remaining columns.

In accordance with various embodiments, a document can be a JavaScript Object Notation (JSON) document and can be thought of as a row in a table in a relational database. Each document is stored in an index and has a type and an ID. It should be noted that although a document can be a JSON object, which contains zero or more fields, or key-value pairs, other entities can be used such as a hash, a hashmap, an associative array. The key-value pairs or other such values can correspond to a number of impressions displayed, a number of selections of an impression, etc. In accordance with an embodiment, a type, for example, is like a table in a relational database. Each type has a list of fields that can be specified for documents of that type. A mapping, for example, defines how each field in the document is analyzed. The ID of a document identifies a document. The document ID can be generated based on properties of the document, properties of the index the document is associated with, a combination thereof, and/or various other naming conventions known in the art. In one example, a when a document is indexed, the ID of the document is updated to include an indication of the index location. This can include an indication that references the indexer, the host computing device executing the indexer, the storage location, or a combination thereof. A document can contain a list of fields, or key-value pairs. The value can be a simple (scalar) value (e.g., a string, integer, date), or a nested structure like an array or an object. A field, for example, is similar to a column in a table in a relational database. The mapping for each field has a field type which indicates the type of data that can be stored in that field, e.g., integer, string, object. The mapping also allows you to define (amongst other things) how the value for a field should be analyzed. An index, for example, is like a database in a relational database.

As described, the processing time of documents scales to the number of documents. Thus, the fewer the documents that have to be processed, the faster a query against those documents executes (i.e., lower latency). Conventional approaches might index the base documents, run aggregations against the base documents to determine aggregated documents of the base documents, and then index the aggregated documents. However, such an approach is not atomic and can result in delays between indexing the base documents and indexing the aggregated documents. Additionally, such an approach can result in inconsistencies between the base documents and aggregated documents due to the delay in indexing. As such, often times the aggregated documents would have to be invalidated and deleted, further adding to reduced performance. Accordingly, in accordance with various embodiments, instead of indexing the base documents and then running aggregations against the indexed base documents, updates to the base documents are determined, and while the base documents are being indexed, the updates made to the base documents are concurrently applied to each respective associated aggregated document. Advantageously, this allows for near atomic updates to the aggregated documents when a base document is updated, which reduces the time consistency issue, latency, and the need for any post processing. Further, such an approach is less prone to network error since when a base document is updated; the aggregated document associated with the base document is immediately updated without the need to reference other base documents.

For example, returning the situation in FIG. 1 where the additional information (e.g., user behavior information) is stored to a table in an appropriate data store, in a first step, update logic is executed to determine a change (e.g., delta)

between an existing base document (e.g., a first version of the base document) and a new base document (e.g., a second version of the base document) and in a second step, the update is applied to aggregated document(s) associated with the base document. Returning to the first step, an indexing service can monitor activity, such as the addition of data and/or documents. In this example, additional information is received. Further in this example, the additional information is in the form of a base document. Receiving the base document (e.g., a first version of the base document) can cause a request to be generated to update a stored version of the base document (e.g., a second version of the base document), where the request can identify a host computing device coupled to a data store that includes the stored base document, an index used to index data on the data store, a document type and a document ID associated with the base document, and an operation (e.g., delete or update) to perform. As described, the index includes one or more documents and is associated with one or more host computing devices. The documents can include base documents, aggregated documents, among other types of documents. The document type is like a table in a relational database. Each document type includes a list of fields that can be specified for documents of that type. A mapping defines how each field in a document is analyzed. The document ID of a document identifies a document. The index/type/ID of a document is unique.

In the situation where the operation is a delete operation, the base document is deleted and the change is returned. The change is the values that where in the deleted base document. In the situation where the operation is an update operation, the change in values (e.g., the delta) between the existing document and the new document is returned. In step two, the aggregated document associated with the base document is updated. For example, in the situation where the operation is a delete operation, any values associated with the base document are subtracted from the aggregated document(s) associated with the base document. In the situation where the operation is an update operation, a change (e.g., delta) is determined between the existing base document (e.g., the first version) and the new base document (e.g., the second version), the new base document is indexed, and the delta is applied to the associated aggregated document.

In accordance with various embodiments, multiple host computing devices may be updating multiple base documents that are associated with the same aggregated document. As such, one of optimistic locking or pessimistic locking can be used to ensure that the base and associated aggregated document are properly updated. Optimistic locking is a strategy where you read a base document, take note of a version number (other methods to do this involve dates, timestamps or checksums/hashes) and check that the version has not changed before you write the base document back. Pessimistic locking is when you lock the base document for your exclusive use until you have finished with it. It has much better integrity than optimistic locking but requires you to be careful with your application design to avoid deadlocks.

In accordance with various embodiments, a mapping between fields of a base document to fields of an associated aggregated document can be used when updating an aggregated document. As described, each base document includes one or more fields and an aggregated document may include one or more fields. A mapping can be used to map or otherwise group fields of a base document to fields of an aggregated document. In accordance with various embodiments, each field can be associated with a field type. Example field types include an accumulated, constant, and default field type. An accumulated field includes fields where the value for the field can be incremented and/or decremented when a new document is created, updated, or deleted. Example accumulated fields include impressions, clicks, etc. A constant field is assumed to be equal for all base documents contributing to an aggregated document. The value can be overwritten with a value from the most recently updated document. A deletion of a base document does not change constant fields. For example, in the situation of aggregating from a first aggregated level to a second aggregated level, the ID for the second aggregated level is constant and the ID remains the same. A field not explicitly configured can use the default field type. Accordingly, a mapping to fields of an aggregated document includes values from related fields from base documents.

Figure 2:
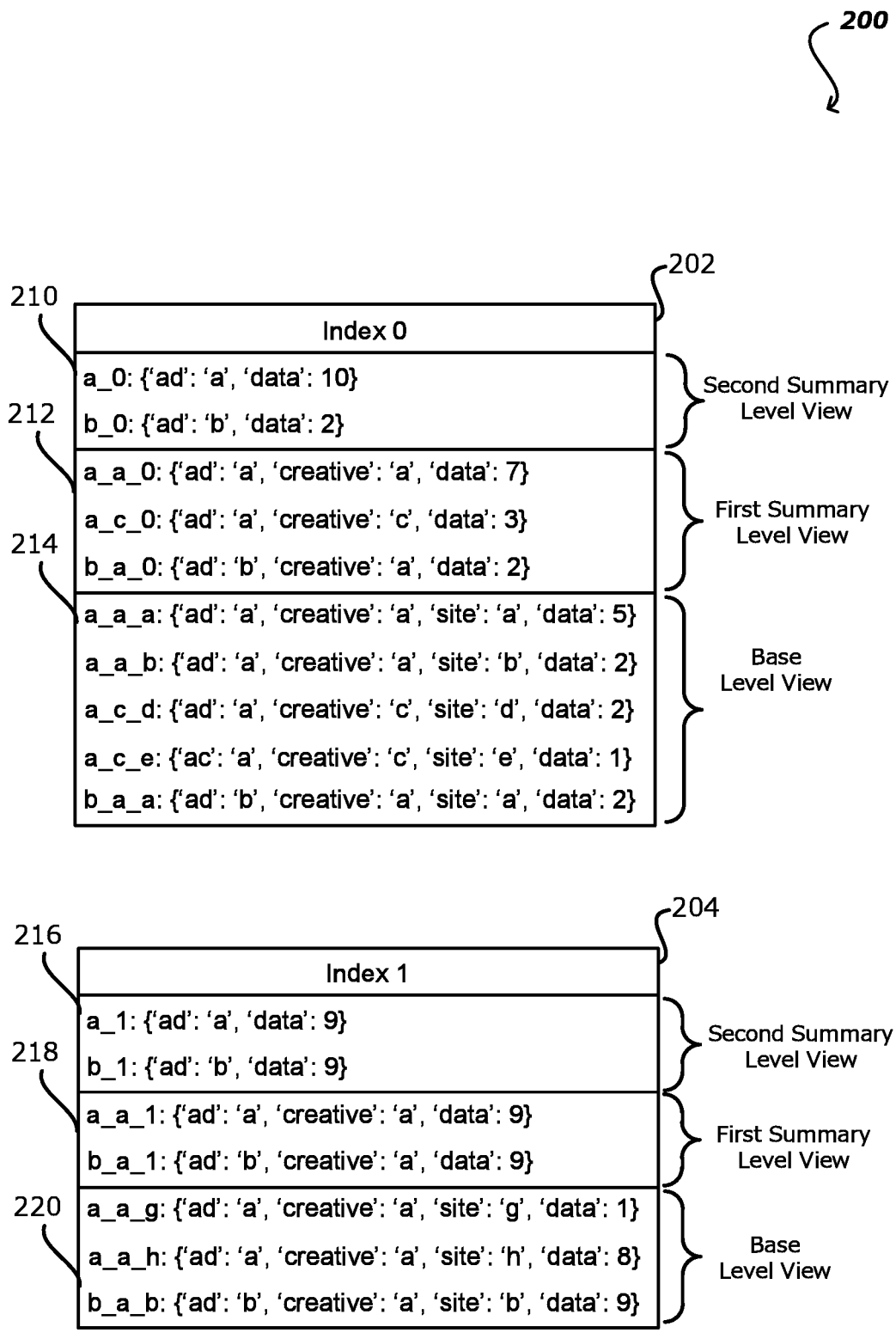
FIG. 2 illustrates an example data layout in accordance with an embodiment.

FIG. 2 illustrates an example 200 on how data may be distributed across two indexes in accordance with one embodiment. As described, an indexing service can be used to index and update documents in a distributed, multi-user system environment. The distributed environment can include a plurality of host computing devices, each having operating thereon a virtual machine instance, where each respective virtual machine instance can run data management software for searching and indexing data (e.g., documents) stored in a data store coupled to each respective host computing device. Each index can include any number of aggregated views of its base documents as additional documents with a subset of fields and a different document type. As shown in FIG. 2, there are two aggregated views in each index for respective base documents. In this example, a first index 202 is used to index documents stored in a first data store and a second index 204 is used to index documents stored in a second data store. It should be noted that the first index and the second index can be on the same host computing device or different host computing devices. It should be further noted that an index can be divided into multiple sections. For example, the first index and the second index can correspond to portions of the same index.

As shown, the first index 202 and the second index 204 include documents arranged in three levels, wherein each level provides a different summary of the data. For example, levels 210 and 216 can provide the highest summary view, levels 212 and 218 can provide an intermediate summary view, and levels 214 and 220 can provide the lowest level view (e.g., granular view) of the documents. In the first index 202, the base level view (e.g., the lowest level view) 214 includes five documents (i.e., a_a_a, a_a_b, a_c_d, a_c_e, b_a_a), the first summary view (e.g., intermediate view) 212 includes three documents, and the second summary level view (e.g., highest summary view) 210 includes two documents. The second summary level view 212 is an aggregated view of its base documents from the base level view 214. As shown, documents a_a_a and a_a_b in the base level view 214 are aggregated into document a_a_0 in the first summary level view, documents a_c_d and a_c_e in the base level view 214 are aggregated into document a_c_0 in the first summary level view 212, and b_a_0 in the base level view 214 is aggregated into document b_a_0 in the first summary level view 212. Further, as shown, documents a_a_0 and a_c_0 in the first summary level view 212 are aggregated into a_0 in the second summary level view 210 and b_a_0 in the first summary level view 212 is aggregated into b_0 in the second summary level view 210. In the second index 204, the base level view 220 includes three documents, the first summary view 218 includes two documents, and the second summary level view 216 includes two documents.

As described, when a base document is updated, the aggregated document(s) associated with the base document is immediately updated without the need to reference other base documents. In this way, only the change (i.e., delta) is applied to the aggregated document. As an example of updating a document, take document a_a_a in base level view 214. In the situation where the document is updated, for example, data is incremented from 5 to 6; the associated aggregate documents would be updated. In this example, the change (or delta) is one. The change is applied to aggregated documents a_a_0 in the first summary level view 212 and aggregated document a_0 in the second summary level view 210. Applying the change would include incrementing the data field of document a_a_0 from 7 to 8 and incrementing the data field of a_0 to from 10 to 11.

Figure 3:
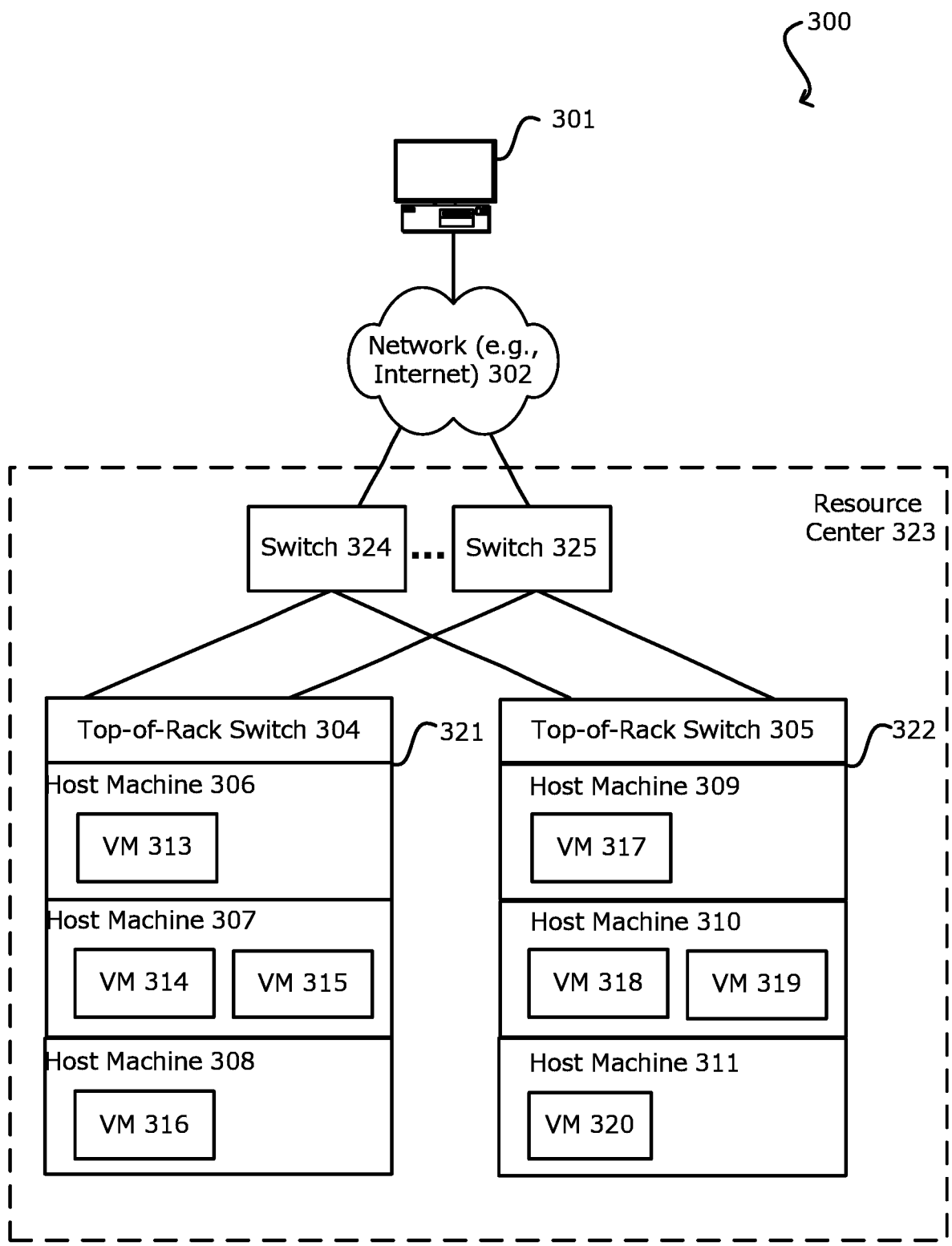
FIG. 3 illustrates an environment in which various embodiments can be implemented.

FIG. 3 illustrates an example 300 of a resource center environment of the service provider that provides computing resources for a customer, in accordance with various embodiments. In the illustrated embodiment, a service provider (e.g., a cloud computing resource provider) can maintain one or more resource centers 323 (e.g., data centers, server farms, etc.) that store the physical resources (e.g., host servers, etc.) of the service provider. These physical resources can be used to host a number of virtual machine instances or virtual servers that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 323 of the service provider may include one or more racks 321, 322 of host servers (306, 307, 308, 309, 310, 311) wherein each host machine on a particular rack is connected to a single top-of-rack (TOR) switch (304, 305). These TOR switches can be further connected to one or more other switches (324, 325) which enable the host servers to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host server can host one or more virtual machine instances (313, 314, 315, 316, 317, 318, 319, 320) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance; the customer can first submit a request to the service provider, indicating the type of VM they would like to use. The service provider may carry out the processes to provision the virtual machine instance which will be hosted on the physical resources (e.g., host machines) of the service provider. The virtual machine instance can then be used to execute the various applications and services on behalf of the customer, utilizing the resources of the service provider. For example, in one such situation, a customer or service provider can use the example environment to manage resources such as data storage. In this example, an indexing service associated with each host machine can be configured to monitory activity on a data store in communication with a respective host machine. Each indexing service can monitor for any additions, deletions and/or modifications to documents in in its monitored data store and update its index in accordance with the approaches described herein. Thereafter, the index can be accessed by any of a number of applications in the same manner as conventional indexes.

Figure 4:
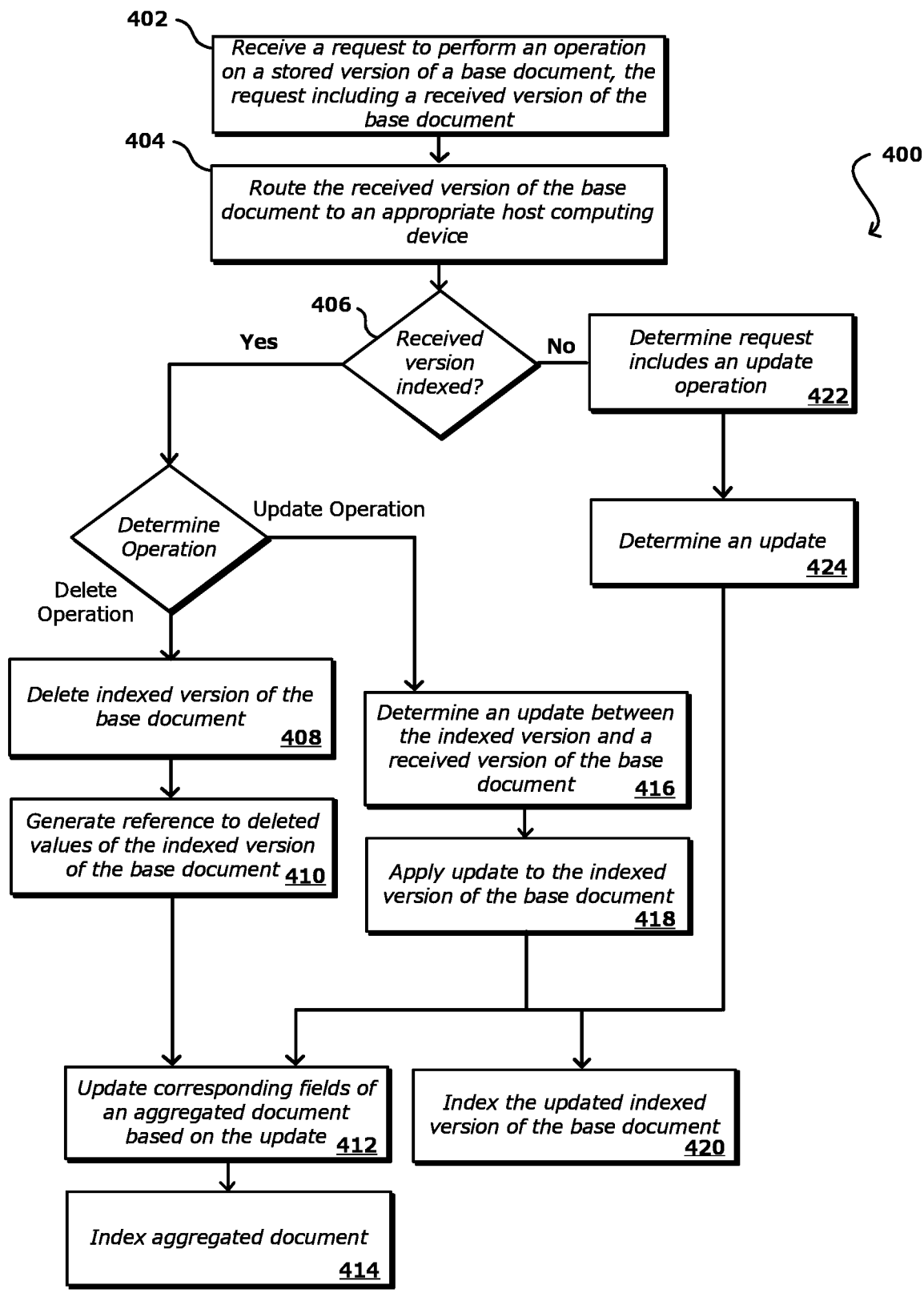
FIG. 4 illustrates an example process for managing resources such as data storage in accordance with one embodiment.

FIG. 4 illustrates an example process 400 for managing resources such as data storage in accordance with one embodiment. It should be understood that, for any process described herein, that there can be additional or fewer steps performed in similar or alternative orders, or in parallel, within the scope of the various embodiments unless otherwise stated. An indexing service can be provided to manage and index data that may be accessed and used over one or more networks by any of various users, applications, processes, and/or services. The indexing service can monitor activity on a data store and any additions, deletions and/or modifications to documents can cause the indexing service to update its index. This index can then be accessed by any of a number of applications in the same manner as conventional indexes. In this example, in a first step, updates to base documents are determined, and in a second step, while the base documents are indexed, the updates made to the base documents are concurrently applied to each respective associated aggregated document.

For example, in accordance with various embodiments, a request to perform an operation (i.e., one of a delete operation or an update operation) on an indexed version of a base document is received 402, the request including a new version of the base document that is associated with a document type and a document ID (or identifier). The request can be received, for example, in response to receiving the base document due to a user search or other such action. In another example, the request can be received in response to detecting activity on a monitored data store and/or other monitored component of a distributed computing environment. In an embodiment, the data store can temporality store data to determine where to route the data. In another embodiment, the data may be routed without temporality being stored. Monitoring the temporary data store can include, for example, periodically polling or scanning the temporary data store to detect changes to the data store. In this example, the indexed version and the new version of the base document are associated with the document type and the document ID. It should be noted that indexed version and new version are used to differentiate between a document received (i.e., the new version) from a document stored (i.e., the indexed version) and that other references can be used to differentiate between the documents. The indexed version and the received version of the base document are associated with a first level data structure that includes at least one multi-value field. As described, the document type can be a classifier that identifies the type of information that can be included in a document. In this case, the classifier specifies the type of information that can be included in the indexed and the received version of the base document. The identifier is a unique ID for a document and can be used to reference, for example, the indexed version of the base document. In accordance with an embodiment, a base document can be thought of as the source level data, or lowest level granularity document, that is indexed. Aggregated documents can be associated with base documents and provide a summary of the base documents.

The received version of the base document is routed 404 to an appropriate host computing device in a distributed computing environment that includes a plurality of host computing devices using at least the identifier. In accordance with an embodiment, each host computing device can include a virtual machine instance, where each respective virtual machine instance can run data management software (e.g., searching and indexing software) for searching and indexing data (e.g., documents) stored in a data store. It should be noted that in a distributed environment the index can be divided into multiple sections, where each section can be managed by a host computing device. For example, a first portion of the index managed by a first host computing device can be used to index a first portion of documents and a second portion of the index managed by a second host computing device can be used to index a second portion of the documents.

A determination is made 406 whether the received version of the base document is indexed. For example, base documents can be stored in a data store coupled to the host computing device, on data storage on the host computing device, among other such locations. Determining whether the received version of the base document is indexed in an index can include, for example, using a lookup table associated with the index to determine whether the identifier associated with the indexed version of the base document is listed in the lookup table, where the lookup table can include the documents indexed by the indexer. In the situation where it is determined that the received version of the base document is indexed and the operation is a delete operation, the corresponding indexed version of the base document is deleted 408 from the index, and a reference to the deleted values associated with fields of the indexed version of the base document is generated 410. In the situation where the indexed version of the base document is associated with an aggregated document, the deleted values of fields of the indexed version of the base document are used to update 412 corresponding fields of the aggregated document. For example, if the indexed version of the base document included data for ten impressions, then, in response to deleting the indexed version of the base document, the indexed version of the base document is deleted from the index and ten impressions are subtracted from the appropriate field in the associated aggregated document. Thereafter, the aggregated document is indexed 414.

In the situation where the operation is an update operation and a version (e.g., the indexed version) of the base document is indexed, an update between the received version of the base document and the indexed version of the base document is determined 416. Determining the update between the received version of the base document and the indexed version of the base document can include, for example, comparing particular values of fields in the received version with values in corresponding fields in the indexed version to determine a difference between the values. In this example, the indexed version of the base document is associated with an aggregated document. As described, the aggregated document includes a second level data structure that includes a field which aggregates values of the at least one multi-value field into one value of the field. The update is applied 418 to the indexed version of the base document to generate an updated indexed version of the base document. The updated indexed version of the base document is indexed 420 while concurrently updating 412 corresponding fields of the aggregated document. Thereafter, the updated aggregated document is indexed 414. For example, in the situation where the indexed version of the base document includes a field that includes ten impressions and the received version of the base document includes a field that includes twelve impressions, the change (i.e., delta) is two. The appropriate field for the aggregated document associated with the indexed version of the base document is incremented by two. It should be noted that although one field is discussed in this example, multiple fields can be updated in the indexed version of the base document as well as the appropriate fields in the aggregated document(s). In the situation where the received version of the base document does not exist and it is determined 422 that the operation is to update/create an indexed version of the base document, an update to apply to an associated aggregated document is determined 424 based at least in part on the values of the fields of the received version of the base document. In this example because the received version does not exist a new index or a default index with no values can be updated to generate an updated indexed version of the base document. The updated version of the base document is indexed 420 while concurrently updating 412 corresponding fields of an associated aggregated document. Thereafter, the associated aggregated document is indexed 414.

Figure 5:
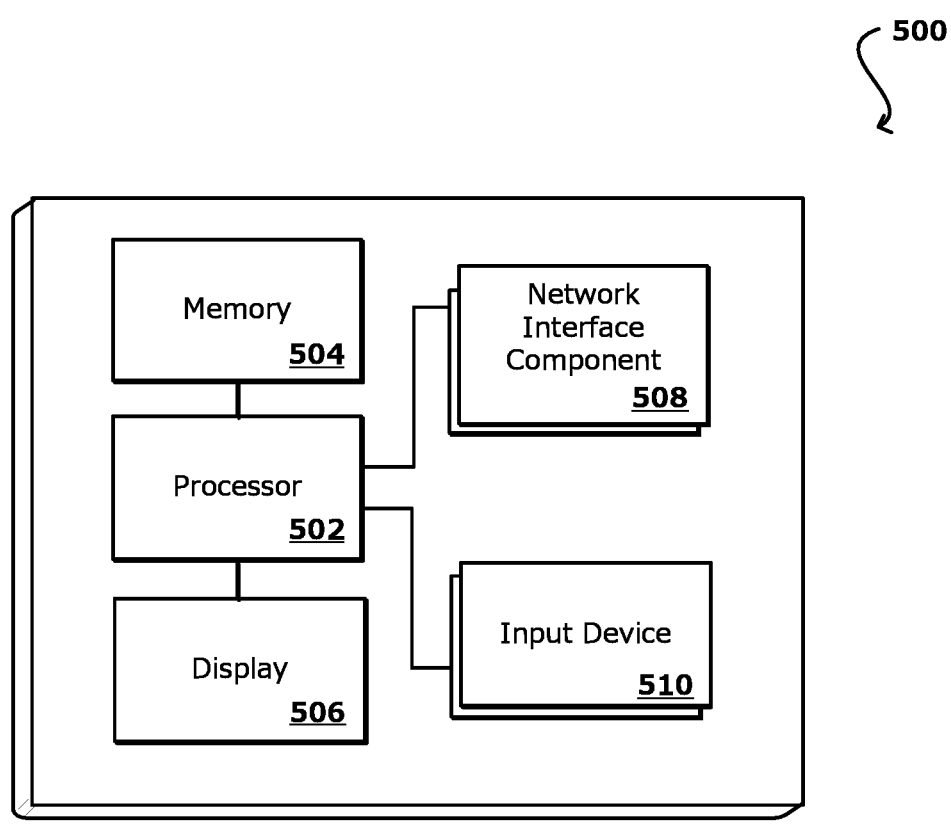
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a received data storage for program instructions for execution by the processor 502, a separate storage for images or data, a removable memory for sharing information with other devices, etc. The device may include some type of display element 506, such as a touch screen or liquid crystal display (LCD), although devices such as portable media players might convey information via other means, such as through audio speakers. The device can include one or more network interface components 508 configured to enable the device to transmit and receive information over a network. As discussed, the device in many embodiments will include at least one input element 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A method comprising:
  receiving a request to perform an operation on a first version of a base document, the base document including at least one of a JavaScript Object Notation (JSON) object, a hashmap, or an associative array, and the request including a second version of the base document and being associated with an identifier, the first version and the second version of the base document having a first level data structure that includes at least one multi-value field;

routing the second version of the base document to a host computing device based at least in part on the identifier, the host computing device configured to operate an indexer and provided by a resource provider of a distributed computing environment;

determining that the first version of the base document is indexed in the index, the first version of the base document associated with an aggregated document, wherein the aggregated document includes a second level data structure that includes a field, the field including a document type indicator, and which aggregates values of the at least one multi-value field into one value of the field;

determining an update between the first version of the base document and the second version of the base document by comparing a value of at least one field in the first version with a value in a corresponding field in the second version;

applying the update to the first version of the base document to generate an updated first version of the base document;

indexing the updated first version of the base document while concurrently updating corresponding fields of the aggregated document to generate an updated aggregated document, the updated aggregated document including a second level data structure having an updated field, the updated field including a document type indicator aggregating values of the at least one multi-value field into one value of the updated field; and referencing a mapping to update the aggregated document based at least in part on the change, the mapping being used to relate one or more fields of the updated first version of the base document to one or more fields of the aggregated document.

2. The method according to claim 1, wherein determining that the first version of the base document is indexed further includes identifying the identifier in a lookup table associated with the index.

3. The method according to claim 1, further comprising indexing the updated aggregated document.

4. A method, comprising:

monitoring a data store in which a plurality of documents is stored, at least a portion of the documents indexed in an index, the plurality of documents including at least one of a JavaScript Object Notation (JSON) object, a hashmap, or an associative array;

detecting a modification to a first document of the plurality of documents;

determining a second document indexed in the index that is a version of the first document, wherein the second document is associated with a first level data structure that includes at least one multi-value field, the at least one multi-value field including a document type indicator, and wherein an aggregated document includes a second level data structure that includes a field which aggregates values of the at least one multi-value field into one value of the field;

determining a change between a first value associated with a field of the first document and a second value associated a corresponding field of the second document;

updating the second document based at least in part on the change to generate an updated second document;

indexing the updated second document while concurrently updating an aggregated document associated with the second document, the updated aggregated document including a second level data structure having an updated field, the updated field including a document type indicator aggregating values of the at least one multi-value field into one value of the updated field; and referencing a mapping to update the aggregated document based at least in part on the change, the mapping being used to relate one or more fields of the second document to one or more fields of the aggregated document.

5. The method according to claim 4, further comprising:

receiving a request to index a third document of the plurality of documents;

determining that the third document is not indexed in the index;

determining at least one aggregated document to associate with the third document; and indexing the third document while concurrently updating the at least one aggregated document based at least in part on values associated fields of the third document.

6. The method according to claim 4, further comprising:

enabling one or more application programming interfaces (APIs) to perform one of an index operation or a search operation against the plurality of documents.

7. The method according to claim 4, wherein detecting the modification further includes:

receiving a request to perform an operation on the first document, the request including the second document, wherein the operation is one of a delete operation or an update modification.

8. The method according to claim 4, wherein updating the second document includes one of incrementing a value in a field of the second document or subtracting a value in a field of the second document.

9. The method according to claim 4, further comprising:

implementing one of pessimistic locking or optimistic locking when updating one or more of the plurality of documents associated with a same aggregated document, wherein pessimistic locking includes locking a document until processing is completed with the document and optimistic locking includes verifying a version number before updating a document.

10. The method according to claim 4, wherein each document of the plurality of documents is associated with a document type, a document identifier, and key-value pairs.

11. The method according to claim 4, further comprising:

segmenting the plurality of documents into a first portion of documents and a second portion of documents, the first portion of documents stored on a first host computing device and indexed using a first index executing on first host computing device, the second portion of documents stored on a second host computing device using a second index executing on the second host computing device.

12. The method according to claim 4, wherein the plurality of documents are distributed across a plurality of data stores, each data store connected to at least one host computing device of a plurality of host computing devices, the plurality of data stores and the plurality of host computing devices provided by a distributed computing environment.

13. The method according to claim 4, wherein a modification includes one of a change in a number of times an impression is viewed, a change in a number of impressions provided by a service provider, a change in user purchase history, a change in user behavior, or a change is click-through rate associated with content.

14. A system, comprising:
   a processor; and
   a memory device including instructions that, when executed by the processor, enables the system to:
   monitor a data store in which a plurality of documents are stored, at least a portion of the documents indexed in an index, the plurality of documents including at least one of a JavaScript Object Notation (JSON) object, a hashmap, or an associative array;
   detect a modification to a first document of the plurality of documents;
   determine a second document indexed in the index that is a version of the first document, wherein the second document is associated with a first level data structure that includes at least one multi-value field, the at least one multi-value field including a document type indicator, and wherein an aggregated document includes a second level data structure that includes a field which aggregates values of the at least one multi-value field into one value of the field;
   determine a change between a first value associated with a field of the first document and a second value associated a corresponding field of the second document;
   update the second document based at least in part on the change to generate an updated second document;
   index the updated second document while concurrently updating an aggregated document associated with the second document, the updated aggregated document including a second level data structure having an updated field, the updated field including a document type indicator aggregating values of the at least one multi-value field into one value of the updated field; and
   reference a mapping to update the aggregated document based at least in part on the change, the mapping being used to relate one or more fields of the second document to one or more fields of the aggregated document.

15. The system according to claim 14, wherein the memory device further includes instructions that, when executed by the processor, enable the system to:
   receive a request to index a third document of the plurality of documents;
   determine that the third document is not indexed in the index;
   determine at least one aggregated document to associate with the third document; and
   index the third document while concurrently updating the at least one aggregated document based at least in part on values associated fields of the third document.

16. The system according to claim 14, wherein the memory device further includes instructions that, when executed by the processor, enable the system to:
   implement one of pessimistic locking or optimistic locking when updating one or more of the plurality of documents associated with a same aggregated document, wherein pessimistic locking includes locking a document until processing is completed with the document and optimistic locking includes verifying a version number before updating a document.

17. The system according to claim 14, wherein the memory device further includes instructions that, when executed by the processor, enable the system to:
   segment the plurality of documents into a first portion of documents and a second portion of documents, the first portion of documents stored on a first host computing device and indexed using a first index executing on first host computing device, the second portion of documents stored on a second host computing device using a second index executing on the second host computing device.

* * * * *